(12) United States Patent
Wei

(10) Patent No.: US 8,307,121 B2
(45) Date of Patent: Nov. 6, 2012

(54) METHOD AND A TYPE OF TRANSMIT AND RECEIVE ENDS FOR DATA SYNCHRONIZATION

(75) Inventor: Wei Wei, Zhejiang Province (CN)

(73) Assignee: Hangzhou H3C Technologies Co., Ltd., Hangzhou (CN)

( * ) Notice: Subject to any disclaimer, the term of this patent is extended or adjusted under 35 U.S.C. 154(b) by 288 days.

(21) Appl. No.: 12/765,335

(22) Filed: Apr. 22, 2010

(65) Prior Publication Data

US 2010/0312916 A1    Dec. 9, 2010

(30) Foreign Application Priority Data

Jun. 3, 2009    (CN) .......................... 2009 1 0085995

(51) Int. Cl.
*G06F 15/16*    (2006.01)
(52) U.S. Cl. ....................................................... 709/248
(58) Field of Classification Search .................... 709/248
See application file for complete search history.

(56) References Cited

U.S. PATENT DOCUMENTS

| | | | |
|---|---|---|---|
| 2009/0106803 A1* | 4/2009 | Chen et al. | 725/103 |
| 2010/0017463 A1* | 1/2010 | Horn et al. | 709/203 |

* cited by examiner

*Primary Examiner* — Wing Chan
*Assistant Examiner* — David X Yi

(57) ABSTRACT

The present invention discloses a method for data synchronization and the transmit (Tx) and receive (Rx) ends used. The data synchronization method applies to distributed systems that comprise a Tx end and at least one Rx end, wherein the Tx end (i) uses one or more bulk data channels to transmit bulk data and a real-time data channel to transmit real-time data, (ii) before a continuous bulk data transfer, sends a message through the real-time data channel to instruct the Rx end(s) to switch to the bulk data channel(s), and (iii) after a continuous bulk data transfer, sends a message through the bulk data channel(s) to instruct the Rx end(s) to switch to the real-time data channel. This invention can guarantee data synchronization for distributed systems with a simple implementation.

10 Claims, 3 Drawing Sheets

METHOD AND A TYPE OF TRANSMIT AND RECEIVE ENDS FOR DATA SYNCHRONIZATION

CROSS-REFERENCE TO RELATED APPLICATIONS

The present application claims priority to Chinese Patent Application CN 200910085995.5 filed in the PRC Patent Office on Jun. 3, 2009, the entire contents of which is incorporated herein by reference.

BACKGROUND

1. Field of the Invention

This invention relates in general to the field of network communications and more particularly to a method and a type of Tx and Rx ends for data synchronization.

2. Description of the Related Art

In a distributed system, for security or fast access purpose, a data copy is usually maintained in each sub-system. This requires that data generated at the data source be synchronized to each sub-system in time.

There are two data synchronization modes: bulk data synchronization and real-time data synchronization. Bulk data synchronization is performed usually after new sub-systems are added to the distributed system or sub-systems are rebooted, where the data source synchronizes the existing data to the newly-added or rebooted sub-systems in bulk. Real-time data synchronization is performed usually when the existing data changes, where the data source synchronizes the data changes to each sub-system. Bulk data is usually transmitted through one or more unicast bulk data channels, while real-time data is usually transmitted through a real-time multicast data channel.

In actual applications, real-time data may also need to be transmitted during bulk data transfers. For data to be correctly synchronized to each sub-system, you must guarantee that data is received by each sub-system in the same order it was sent from the data source. For example, when the data source synchronizes bulk data increments as well as real-time data deletion to a sub-system (Rx end), the sub-system must receive the data in the same order it was sent from the source. Otherwise, some of the data deletion may fail to be synchronized to the sub-system.

In the existing technologies, only a multicast real-time data channel is present between the data source and stable sub-systems. After a new sub-system is added to the distributed system or a sub-system is rebooted, a unicast bulk data channel will be first established between the new or rebooted sub-system and the data source, and data will be synchronized to the sub-system in bulk through the bulk data channel. If real-time data is generated during the bulk data transfer, the data source, while transmitting the real-time data to stable sub-systems through the multicast real-time data channel, transmits the real-time data to the new or rebooted sub-system through the unicast bulk data channel as well. As shown in FIG. 1, sub-system N is a newly-added sub-system. During the bulk data transfer, real-time data is also transmitted through the unicast bulk data channel to sub-system N. After the bulk data transfer is complete, the newly-added or rebooted sub-system switches to the multicast real-time data channel.

However, because the data source and sub-system are unlikely to reach an agreement on when the bulk data transfer will end, it is possible that the order in which the sub-system receives data is inconsistent with the order in which the data source sends data. As a result, the sub-system may fail to receive some of the data, that is, data is not completely synchronized between the data source and the sub-system. For the data source and sub-systems to reach agreements on the ending time of bulk data transfers, complicated system support is required.

SUMMARY OF THE INVENTION

The present invention provides a method and a type of Tx and Rx ends for data synchronization, which guarantees data synchronization in distributed systems with simple implementation, comprising:

A method for data synchronization, which applies to distributive systems that comprise a Tx end and at least one Rx end, wherein:

the Tx end 1) uses one or more bulk data channels to transmit bulk data and a real-time data channel to transmit real-time data; 2) before a continuous bulk data transfer, sends a message through the real-time data channel to instruct the Rx end(s) to switch to the bulk data channel(s); 3) after a continuous bulk data transfer, sends a message through the bulk data channel(s) to instruct the Rx end(s) to switch to the real-time data channel.

A type of Tx end for data synchronization, further comprising a data transfer unit and a messaging unit, wherein:

the data transfer unit uses one or more bulk data channels to transmit bulk data and a real-time data channel to transmit real-time data;

the messaging unit, before the data transfer unit starts a continuous bulk data transfer, sends a message through the real-time data channel to instruct the Rx end(s) to switch to the bulk data channel(s); after the data transfer unit finishes a continuous bulk data transfer, sends a message through the bulk data channel(s) to instruct the Rx end(s) to switch to the real-time data channel.

A type of Rx end for data synchronization, further comprising a data receive unit, a message receive unit, and a channel switch unit, wherein:

the data receive unit uses a bulk data channel to receive bulk data and a real-time data channel to receive real-time data;

the message receive unit, when receiving through the real-time data channel a message instructing the Rx end to switch to the bulk data channel, sends a First Switch Notice to the channel switch unit; when receiving through the bulk data channel a message instructing the Rx end to switch to the real-time data channel, sends a Second Switch Notice to the channel switch unit;

the channel switch unit, after receiving a First Switch Notice, switches to the bulk data channel; after receiving a Second Switch Notice, switches to the real-time data channel.

As described above, in the data synchronization method of the present invention, bulk data and real-time data are transmitted through the bulk data channel(s) and real-time data channel separately, and channel switchover messages are sent before and after continuous bulk data transfers. In this way, the Rx end(s) can always switch to the right channels before the Tx end sends data through different channels, thus guaranteeing that the Rx end(s) receives data in the same order the Tx end sends it. The invention does not require complicated system support to ensure that the Tx and Rx ends reach agreements on the ending time of bulk data transfers. Rather, it can guarantee consistent channel switchover between the Tx and Rx ends by employing some control messages, which is much simpler.

DETAILED DESCRIPTION

For a better understanding of the present invention, and to show more clearly how it may be carried into effect, reference will now be made, by way of example, to the accompanying drawings which aid in understanding embodiments of the present invention and in which:

The method disclosed in the present invention comprises: the Tx end 1) uses one or more bulk data channels to transmit bulk data and a real-time data channel to transmit real-time data; 2) before a continuous bulk data transfer, sends a message through the real-time data channel to inform the Rx end(s) to switch to the bulk data channel(s); 3) after a continuous bulk data transfer, sends a message through the bulk data channel(s) to inform the Rx end(s) to switch to the real-time data channel;

accordingly, the Rx end(s) 1) uses the bulk data channel(s) to receive bulk data and the real-time data channel to receive real-time data; 2) switches to the bulk data channel(s) after receiving through the real-time data channel a message instructing it to switch to the bulk data channel(s); 3) switches to the real-time data channel after receiving through the bulk data channel(s) a message instructing it to switch to the real-time data channel.

In the existing technologies, after a new sub-system is added to the distributed system or a sub-system is rebooted, a bulk data channel is first established, through which both bulk data and real-time data are transmitted. When the bulk data transfer ends, the system switches to the real-time data channel. In the present invention, after a new sub-system is added to the distributed system or a sub-system is rebooted, both a real-time data channel and a bulk data channel will be established to transmit real-time data and bulk data separately. To instruct sub-systems at the Rx ends to switch to the right channels so that data can be received in the same order it was sent, the present invention employs a type of control messages. The following describes in details the method and the Tx/Rx ends of the present invention with two embodiments.

Figure 1:
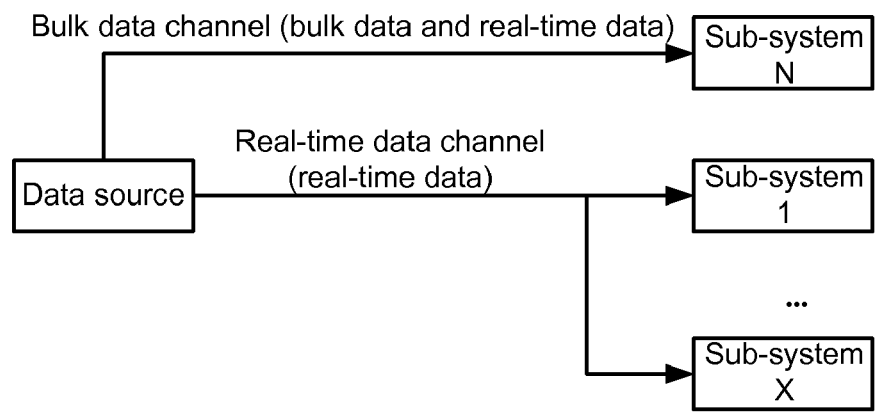
FIG. 1 is the schematic diagram illustrating data synchronization for distributed systems in existing technologies.
Figure 2:
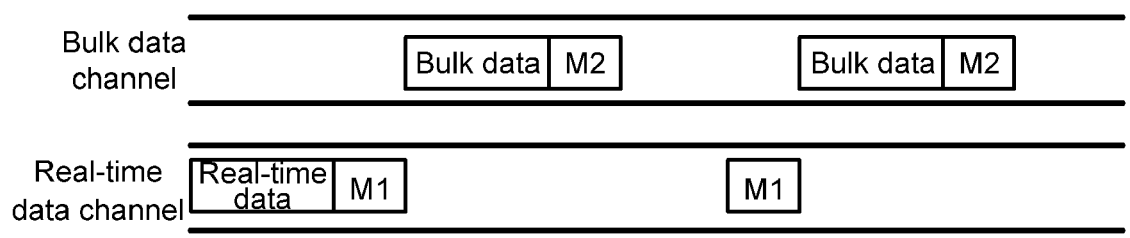
FIG. 2 is the schematic diagram illustrating the data synchronization solution provided in embodiment 1 of the present invention.

Embodiment 1, where the distributed system contains only one sub-system:

As shown in FIG. 2, a real-time data channel and a bulk data channel are established between the data source (Tx end) and sub-system (Rx end). The data source sends real-time data through the real-time data channel and bulk data through the bulk data channel as needed.

Because bulk data is sometimes sent periodically or real-time data may need to be sent during bulk data transfers, some special processing is required for correct channel switchover before and after bulk data transfers. The special processing comprises: before a continuous bulk data transfer, the Tx end sends an M1 message through the real-time data channel; after continuous bulk data transfer, the Tx end sends an M2 message through the bulk data channel. M1 and M2 are control messages.

Upon startup, the sub-system is either at the real-time data channel or at the bulk data channel. After receiving an M1 message at the real-time data channel, it switches to the bulk data channel to receive bulk data; after receiving an M2 message at the bulk data channel, it switches to the real-time data channel.

Note that, the data source may send an M2 message through the bulk data channel after a continuous bulk data transfer even when there is no real-time data to send. As a result, the sub-system may not receive any real-time data after switching to the real-time data channel upon receiving an M2 message. It switches back to the bulk data channel after receiving an M1 message.

After all the bulk data is sent, no M1 messages will be sent through the real-time data channel. Consequently, the Rx end stays in the real-time data channel.

Embodiment 2, where the distributed system contains multiple sub-systems and bulk data needs to be synchronized to multiple sub-systems.

Figure 3:
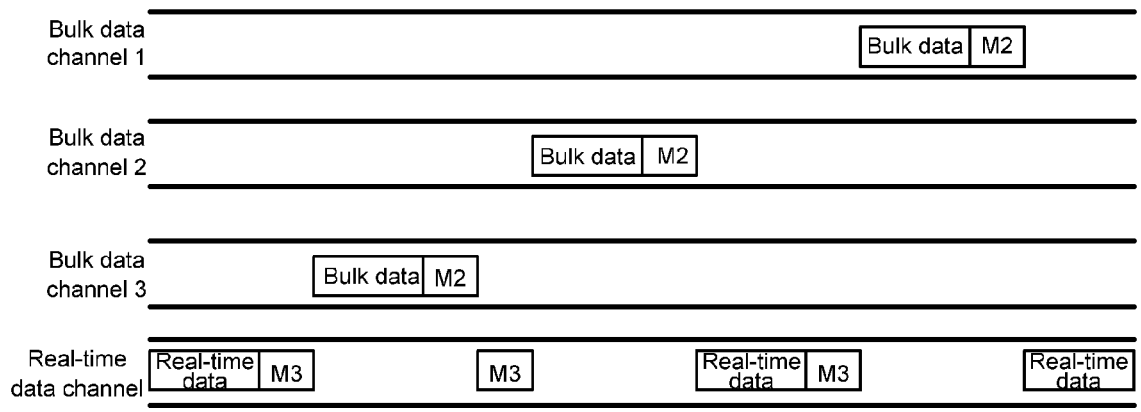
FIG. 3 is the schematic diagram illustrating the data synchronization solution provided in embodiment 2 of the present invention.

This embodiment can be implemented in either of the following two modes:

Mode 1: A unicast bulk data channel is established between the data source and each sub-system and all sub-systems join the multicast real-time data channel. As shown in FIG. 3, assume that bulk data channels 1, 2, and 3 correspond to sub-systems 1, 2, and 3 respectively, and all these sub-systems have joined the real-time data channel.

After a continuous bulk data transfer, the data source sends the same M2 message through each bulk data channel. Before a continuous bulk data transfer, the data source sends an M3 message through the real-time data channel. Because the real-time data channel is a multicast channel, all the sub-systems will receive this message. Hence, the M3 message needs to carry information about the Rx ends, that is, sub-systems that are supposed to receive the bulk data, to specify sub-systems that need to switch to the corresponding bulk data channels.

After a sub-system receives an M3 message through the real-time data channel, it determines whether the Rx end information carried in the message includes itself; if yes, it switches to the corresponding bulk data channel; if not, it discards the message and remains in the real-time data channel. After receiving an M2 message at the bulk data channel, it switches to the real-time data channel.

After all the bulk data is synchronized to a sub-system, no M3 messages carrying information about this particular sub-system will be sent through the real-time data channel. Thus, the sub-system stays in the real-time data channel from then on.

Mode 2: A multicast bulk data channel is established between the data source and sub-systems and all the sub-systems have joined the multicast bulk data channel and multicast real-time data channel. Assume that sub-systems 1, 2, and 3 have all joined the multicast bulk data channel and multicast real-time data channel. Sub-systems 1 and 2, having just been added to the distributed system or rebooted, need to receive bulk data, and sub-system 3 has finished receiving bulk data and exited the bulk data channel.

After a continuous bulk data transfer, the data source sends an M2 message in the bulk data channel; before a continuous bulk data transfer, the data source sends an M1 message in the real-time data channel. This process is the same as that in embodiment 1. The difference is that, after receiving an M1 message, an Rx end further determines whether it has finished receiving bulk data; if yes, it does not switch to the bulk data channel and stays in the real-time data channel instead (sub-system 3 for example); otherwise, it switches to the bulk data channel (sub-systems 1 and 2). An Rx end judges whether it has finished receiving bulk data by judging whether it has exited the bulk data channel.

The following part describes in details the Tx and Rx ends disclosed in the presented invention.

Figure 4:
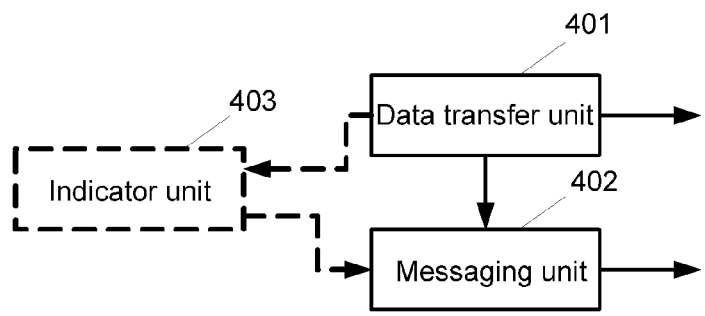
FIG. 4 is the block diagram of the Tx end according to an embodiment of the present invention.

FIG. 4 is the block diagram of the Tx end according to an embodiment of the present invention. As shown in FIG. 4, the Tx end comprises data transfer unit 401 and messaging unit 402.

Data transfer unit 401 uses one or more bulk data channels to transmit bulk data and a real-time data channel to transmit real-time data.

Messaging unit 402, before data transfer unit 401 starts a continuous bulk data transfer, sends a message through the real-time data channel to instruct the Rx end(s) to switch to the bulk data channel(s); after the data transfer unit finishes a continuous bulk data transfer, sends a message through the bulk data channel(s) to instruct the Rx end(s) to switch to the real-time data channel, wherein:

the bulk data channel is a unicast channel, while the real-time data channel is a multicast channel.

When there are multiple unicast bulk data channels, the Tx end further comprises indicator unit 403, which specifies the Rx ends of the bulk data sent by data transfer unit 401 and inserts the Rx end information in the messages sent to instruct Rx ends to switch to bulk data channels.

Figure 5:
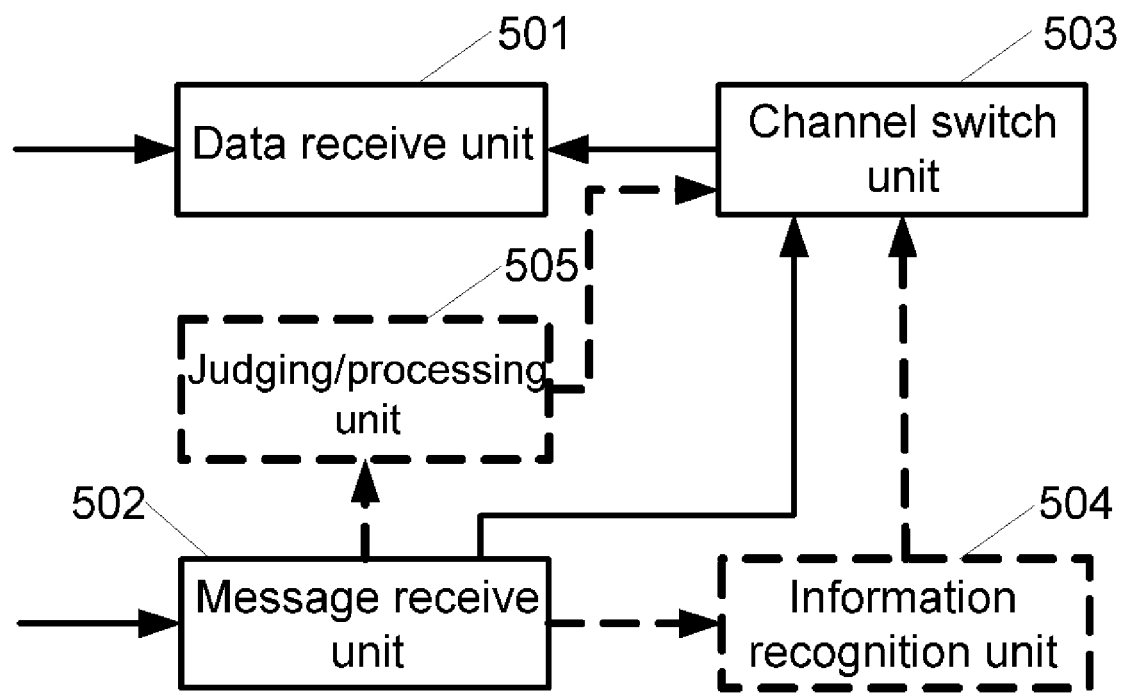
FIG. 5 is the block diagram of the Rx end according to an embodiment of the present invention.

FIG. 5 is the block diagram of the Rx end according to an embodiment of the present invention. As shown in FIG. 5, the Rx end comprises data receive unit 501, message receive unit 502, and channel switch unit 503. Data receive unit 501 uses a bulk data channel to receive bulk data and a real-time data channel to receive real-time data.

Message receive unit 502, when receiving through the real-time data channel a message instructing the Rx end to switch to the bulk data channel, sends a First Switch Notice to channel switch unit 503; when receiving through the current bulk data channel a message instructing the Rx end to switch to the real-time data channel, sends a Second Switch Notice to channel switch unit 503.

Channel switch unit 503, after receiving a First Switch Notice, switches the Rx end to the bulk data channel; after receiving a Second Switch Notice, switches the Rx end to the real-time data channel, wherein:

the bulk data channel is a unicast channel, while the real-time data channel is a multicast channel.

When there are multiple unicast bulk data channels, the Rx end further comprises information recognition unit 504, which receives First Switch Notices from message receive unit 502 and judges whether the Rx end information carried in the channel switchover messages includes the current Rx end; if yes, the information recognition unit sends the First Switch Notices to channel switch unit 503; if not, it discards the notices.

When the bulk data channel is a multicast channel, the Rx end further comprises judging/processing unit 505, which receives First Switch Notices from message receive unit 502 and judges whether the Rx end has finished receiving bulk data; if yes, the judging/processing unit discards the First Switch Notices; if not, it sends the notices to channel switch unit 503.

As described above, in the data synchronization method of the present invention, bulk data and real-time data are transmitted through the bulk data channel(s) and real-time data channel separately, and channel switchover messages are sent before and after continuous bulk data transfers. In this way, the Rx end(s) can always switch to the right data channel(s) when the Tx end sends data through different channels, thus guaranteeing that the Rx end(s) receives data in the same order the Tx end sends it. The present invention does not require complicated system support to ensure that the Tx and Rx ends can always reach agreements on the ending time of bulk data transfers.

Rather, it can guarantee consistent channel switchover between the Tx and Rx ends by simply employing some control messages.

The embodiments of the present invention provide detailed implementation of the present invention, which applies to distributed systems that contain only one sub-system or multiple sub-systems.

Although two embodiments of the invention and their advantages are described in detail, a person skilled in the art could make various alternations, additions, and omissions without departing from the spirit and scope of the present invention as defined by the appended claims.

What is claimed is:

1. A method for data synchronization, which applies to distributed systems that comprise a transmitting (Tx) device and at least one receiving (Rx) device, the method comprising:
   the Tx device using one or more bulk data channels to transmit bulk data and a real-time data channel to transmit real-time data to the at least one Rx device;
   prior to a continuous bulk data transfer, the Tx device sending a first message through the real-time data channel to instruct the at least one Rx device to switch to the one or more bulk data channels; and
   after the continuous bulk data transfer, the Tx device sending a second message through the one or more bulk data channels instructing the at least one Rx device to switch to the real-time data channel, wherein
   the first message instructing the at least on Rx device to switch to the one or more bulk data channels carries Rx device information,
   the Rx device determines whether the Rx device information carried in the first message includes itself,
   the Rx device switches to a corresponding one of the one or more bulk data channels indicated in the Rx device information, if the Rx device determines that the first message includes itself, and
   the Rx device remains on the real-time data channel, if the Rx device determines that the first message does not include itself.

2. The method of claim 1, wherein the one or more bulk channels comprise multiple unicast channels or a multicast channel, and the real-time data channel comprises a multicast channel.

3. The method of claim 1, wherein,
   the at least one Rx device uses the one or more bulk data channels to receive bulk data and the real-time data channel to receive real-time data,
   the at least one Rx device switches to the one or more bulk data channels after receiving through the real-time data channel the first message instructing it to switch to the one or more bulk data channels, and
   the at least one Rx device switches to the real-time data channel after receiving through the one or more bulk data channels the second message instructing it to switch to the real-time data channel.

4. The method of claim 3, wherein the one or more bulk data channels is a multicast channel, and before switching to the bulk data multicast channel, the Rx device determines whether it has previously finished receiving bulk data on the bulk data multicast channel;

if the Rx device determines that it has previously finished receiving bulk data on the bulk data multicast channel, the Rx device does not switch to the bulk data multicast channel;

if the Rx device determines that it has not previously finished receiving bulk data on the bulk data multicast channel, the Rx device does switch to the bulk data multicast channel.

5. A transmitting (Tx) device for data synchronization, comprising:

a data transfer unit to use one or more bulk data channels to transmit bulk data and a real-time data channel to transmit real-time data; and a messaging unit to, prior to the data transfer unit starting a continuous bulk data transfer, send a first message through the real-time data channel instructing one or more receiving (Rx) devices to switch to the one or more bulk data channel, wherein the messaging unit is to, after the data transfer unit finishes the continuous bulk data transfer, send a second message through the one or more bulk data channels instructing the one or more Rx devices to switch to the real-time data channel, the first message instructing the at least on Rx device to switch to the one or more bulk data channels carries Rx device information, the Rx device is to switch to a corresponding one of the one or more bulk data channels indicated in the Rx device information, if the first message includes the Rx device, and the Rx device is to remain on the real-time data channel, if the first message does not include the Rx device.

6. The Tx device of claim 5, wherein the one or more bulk data channels are unicast channels, and the real-time data channel is a multicast channel.

7. The Tx device of claim 5, wherein the data transfer unit is to use a plurality of bulk data channels to transmit bulk data; and wherein the Tx device further comprises an indicator unit to specify the intended Rx device targets of the bulk data sent by the data transfer unit and insert the intended Rx device target information in the first message sent to instruct Rx devices to switch to the one or more bulk data channels.

8. A receiving (Rx) device for data synchronization, comprising:

a data receive unit to receive bulk data through a bulk data channel and real-time data through a real-time data channel;

a message receive unit to, responsive to receiving through the real-time data channel a first message instructing the Rx device to switch to a bulk data channel, send a first switch notice to the channel switch unit, and responsive to receiving through the bulk data channel a second message instructing the Rx device to switch to the real-time data channel, send a second switch notice to the channel switch unit;

a channel switch unit to, responsive to receiving the first switch notice, switch the Rx device to a bulk data channel, and responsive to receiving the second switch notice, switches the Rx device to the real-time data channel; and an information recognition unit to receive the first switch notice from the message receive unit and to determine whether the Rx device information carried in the notice includes the current Rx device as an intended target, wherein the information recognition unit, responsive to determining that the Rx device information includes the current Rx device as an intended target, forwards the first message to the channel switch unit, and the information recognition unit, responsive to determining that the Rx device information does not include the current Rx device as an intended target, discards the first message.

9. The Rx device of claim 8, wherein the bulk data channel is a unicast channel, and the real-time data channel is a multicast channel.

10. The Rx device of claim 8, wherein the bulk data channel is a multicast channel;

wherein the Rx device further comprises a judging/processing unit that receives the first switch notice from the message receive unit and determines whether the Rx device has previously finished receiving bulk data on the bulk data multicast channel;

wherein, if the judging/processing unit determines that it has previously finished receiving bulk data on the bulk data multicast channel, the judging/processing unit discards the first switch notice; and wherein, if the judging/processing unit determines that it has not previously finished receiving bulk data on the bulk data multicast channel, the judging/processing unit forwards the first switch notice to the channel switch unit.

* * * * *

UNITED STATES PATENT AND TRADEMARK OFFICE
CERTIFICATE OF CORRECTION

PATENT NO. : 8,307,121 B2
APPLICATION NO. : 12/765335
DATED : November 6, 2012
INVENTOR(S) : Wei Wei Page 1 of 1

It is certified that error appears in the above-identified patent and that said Letters Patent is hereby corrected as shown below:

In the Claims

In column 6, line 50, in Claim 2, after "bulk" insert -- data --.

Signed and Sealed this
Twenty-first Day of May, 2013

Teresa Stanek Rea
*Acting Director of the United States Patent and Trademark Office*